United States Patent [19]
van Barneveld

[11] Patent Number: 4,934,879
[45] Date of Patent: Jun. 19, 1990

[54] CUTTING TOOL FOR CHIP CUTTING METAL WORK

[75] Inventor: Marinus van Barneveld, AV Zevenaar, Netherlands

[73] Assignee: Nederlandse Hardmetaal Fabrieken B.V., Arnhem, Netherlands

[21] Appl. No.: 418,759

[22] Filed: Oct. 5, 1989

Related U.S. Application Data

[63] Continuation of Ser. No. 140,525, Jan. 4, 1988, abandoned.

[30] Foreign Application Priority Data

Jan. 9, 1987 [DE] Fed. Rep. of Germany ... 8700393[U]

[51] Int. Cl.$^5$ .............................................. B23P 15/28
[52] U.S. Cl. ..................................... 407/66; 407/113; 407/115; 407/116
[58] Field of Search ...................... 407/66, 67, 70, 113, 407/114, 115, 116

[56] References Cited

U.S. PATENT DOCUMENTS

| | | | |
|---|---|---|---|
| 3,792,514 | 2/1974 | Ushijima | 29/95 |
| 4,214,845 | 7/1980 | Mori | 407/114 |
| 4,447,175 | 5/1984 | Warren | 407/116 |

FOREIGN PATENT DOCUMENTS

| | | |
|---|---|---|
| 0066091 | 12/1982 | European Pat. Off. . |
| 0143758 | 6/1985 | European Pat. Off. . |
| 2231631 | 2/1973 | Fed. Rep. of Germany . |
| 3522542 | 9/1986 | Fed. Rep. of Germany . |
| 52-298885 | 7/1977 | Japan . |
| 2004477 | 4/1979 | United Kingdom . |

OTHER PUBLICATIONS

Toshiba Tungaloy K.K., "Throw-Away-Tip", Patent Abstracts of Japan, vol. 4, No. 76 (M-14) [558], Jun. 3rd, 1980.
"Sumitomo's Revolutionary New Carbide Inserts", Tooling and Production, vol. 45, Nr. 12, Mar. 1980, p. 140.
S. V. Apraksin, "Throwaway Multi-Facet Tips with a New Rake Face Form", Soviet Engineering Research, vol. 4, No. 1, Jan. 1984, pp. 67–68.

Primary Examiner—Frederick R. Schmidt
Assistant Examiner—Lawrence Cruz
Attorney, Agent, or Firm—Spencer & Frank

[57] ABSTRACT

In a cutting tool having a cutting element, the rake angle in the region following the land is approximately 35° and decreases with increasing distance from the land. Beginning at a distance from the land corresponding approximately to the width of the land, a plurality of chip ridges project from the cutting face in the region between the cutting point regions to form a rake angle of about one-half the rake angle of the cutting face and whose frontal face on the side of the cutting edge projects to about the level of the land. The cutting face regions following the cutting face regions disposed between the chip ridges when seen in the chip discharge direction are configured as ramp elevations and are provided with run-up ramps ascending from the cutting face.

4 Claims, 7 Drawing Sheets

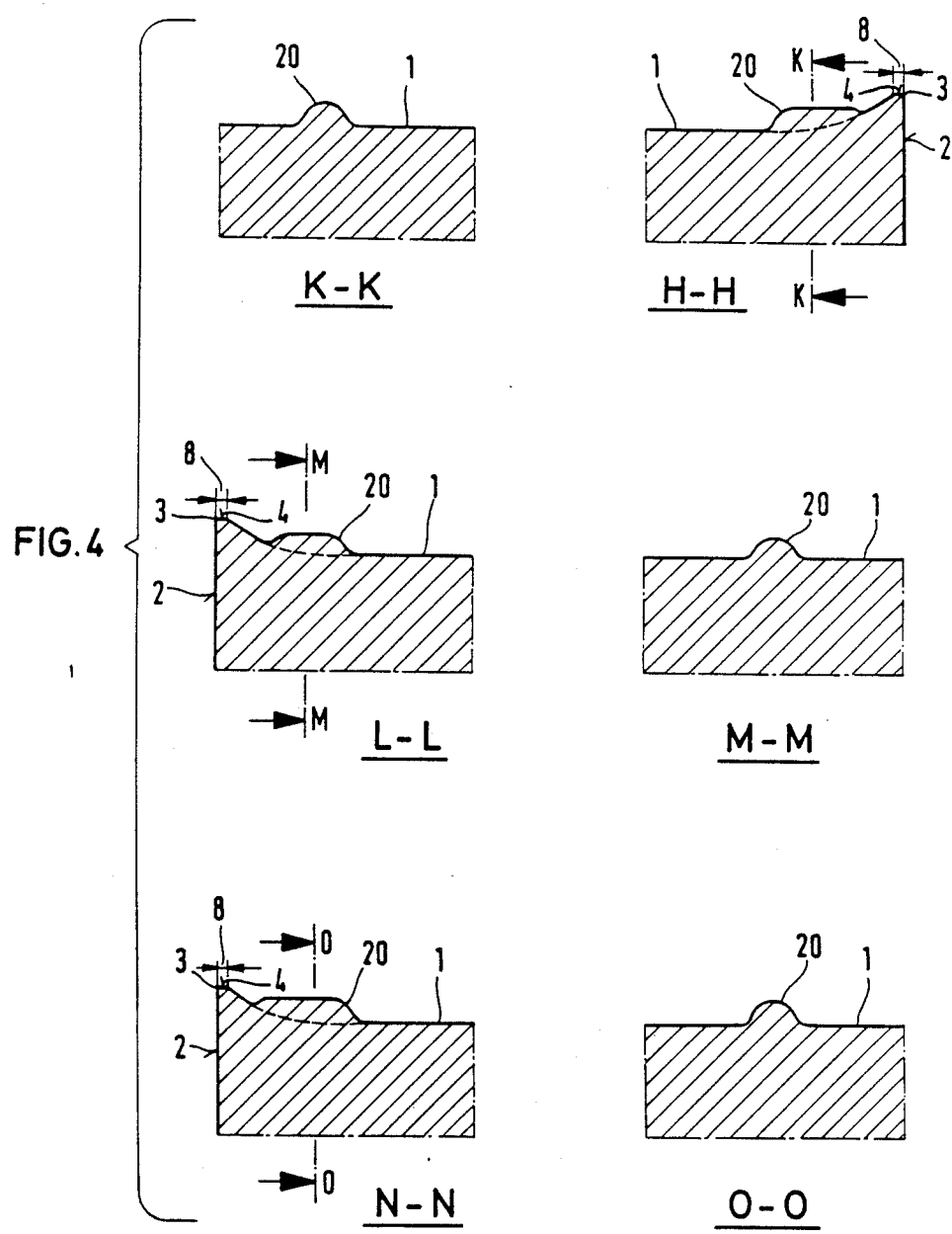

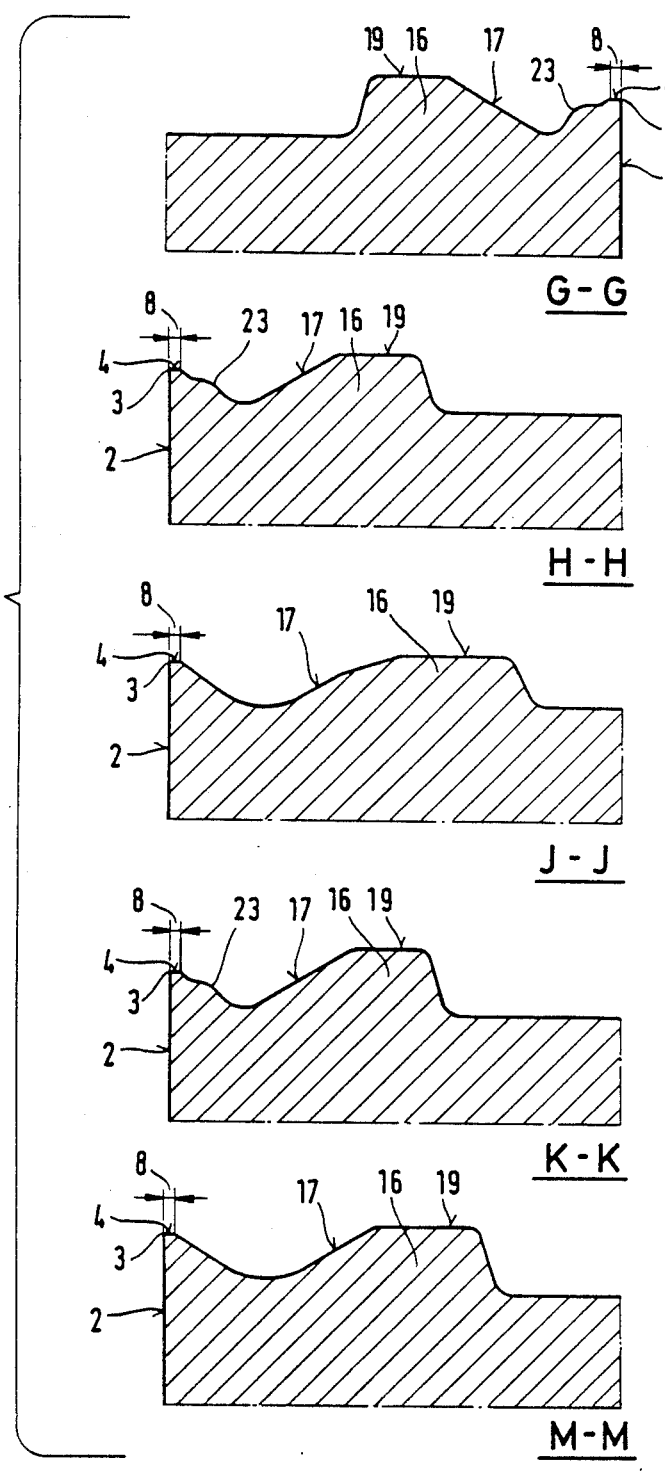

CUTTING TOOL FOR CHIP CUTTING METAL WORK

This application is a continuation of application Ser. No. 07/140,525, filed Jan. 4th, 1988 now abandoned.

BACKGROUND OF THE INVENTION

The invention relates to a chip cutting tool for metal working having a clamping shaft and an interchangeable cutting element.

In a tool of the above type known from DE-C 2,309,443, the raised chip cutting face portions are formed by projections in the form of spherical segments which act as chip breakers. However, their effectiveness as chip breaker is only limited because it is substantially dependent on feed, i.e. on the thickness of the chips.

SUMMARY OF THE INVENTION

It is the object of the invention to configure a cutting tool of the above-mentioned type so that even with greatly differing feed rates or chip thicknesses and cutting speeds a uniformly good chip forming behavior is ensured. Due to upwardly projecting chip ridges which are parallel to one another in the chip discharge direction, the outgoing chip lies only partially on the cutting face. This causes the chips to be heated considerably and thus the chip material to be hardened. Thus, the material becomes more susceptible to breakage and is therefore optimally prepared for subsequent chip breaking. The actual chip breaking is effected by the ramp elevations which are offset with respect to the chip ridges. During its discharge over the chip ridges, the chip is already deformed to a certain extent toward the bottom of the groove in the region of the chip faces disposed between the chip ridges. At a right angle to the direction of chip discharge, the chip is thus slightly wavy. The wave formation is stressed in the opposite direction by the ramp elevations. This causes a torsion to be exerted on the discharging chip about an axis extending in the discharge direction. This torsion increases the degree of deformation and causes the chip to break with even greater certainty. The distance maintained by the cutting face ridges with respect to the land has the result that, when cutting begins, the chip moves toward the front edges of the cutting face ridges and is bent upward there. If the feed rate is slow or the chip thicknesses are low, chip breaking will already take place here. With greater feed rates or chip thicknesses, the chip, after cutting has started, runs onto the surfaces or backs of the chip ridges and thus comes out of contact with the lands. With greater feed rates or chip thicknesses, the land is treated considerably more gently in continuous operation. In a modified embodiment of the invention, the selected surface configuration of the cutting face regions between land and the ramp elevations reduces the contact faces between chip and cutting face of the cutting element and thus enhances the desired chip formation or breaking process. It is possible to configure both cover faces of the cutting element according to the invention so as to make the cutting element reversible. To accomplish this, the ramp elevations, which lie in the same plane with the lands in the region of the cutting points together with the above-mentioned land regions, form the contact face of the cutting element surface which is not in the operating position.

BRIEF DESCRIPTION OF THE DRAWINGS

The subject matter of the invention will be described in greater detail with reference to embodiments that are illustrated in figures. It is shown in:

FIG. 4, various sectional detail views H—H, K—K, L—L, M—M, N—N and O—O of FIG. 2;

FIG. 8, sectional detail views corresponding to lines G—G, H—H, J—J, K—K and M—M of FIG. 5.

DETAILED DESCRIPTION OF THE PREFERRED EMBODIMENT

Figure 1:
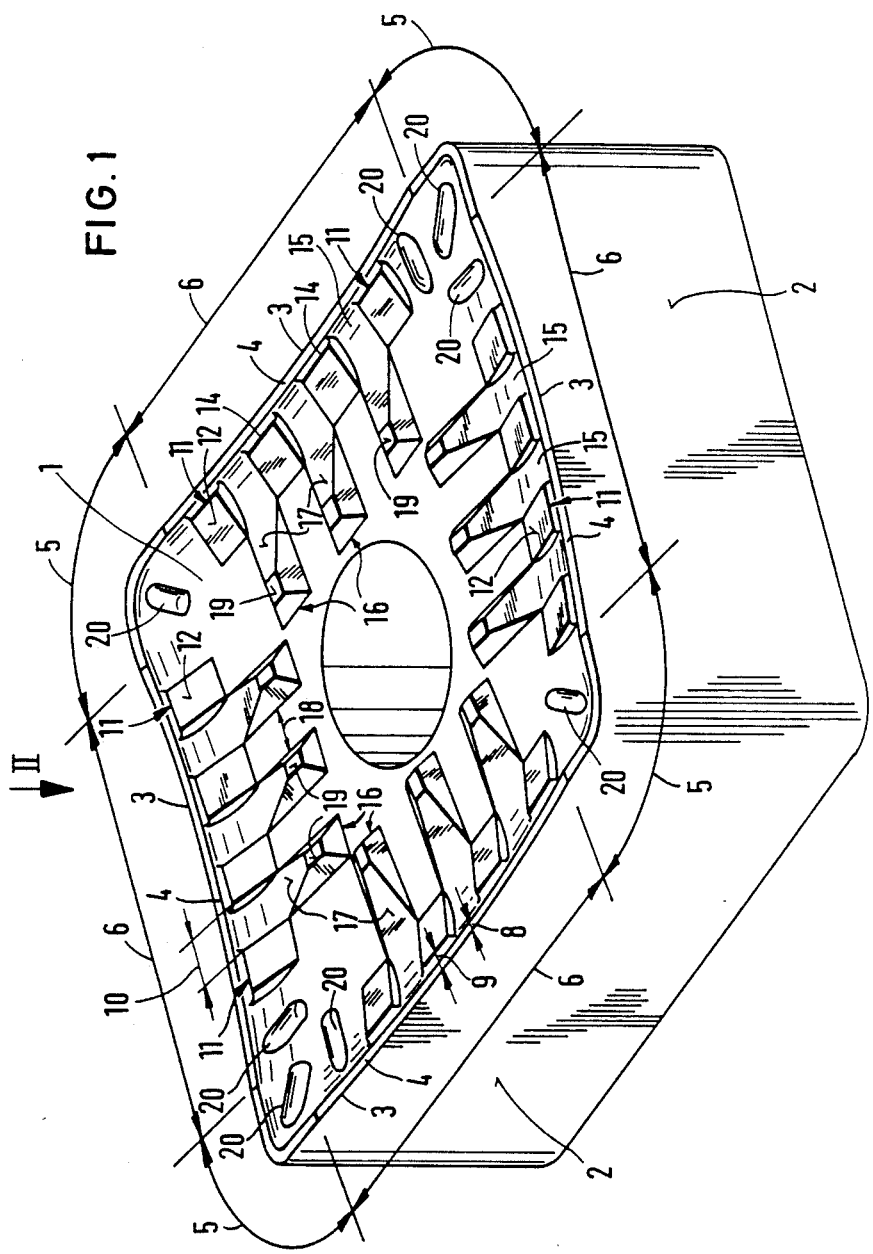
FIG. 1, a perspective view of a first embodiment of the cutting element according to the invention.

The cutting element of the cutting tool according to the invention is made of a hard cutting material and has a rhombic outline. Its cover face forms cutting face 1 and its circumferential side faces are flanks 2. In the region of its cutting edge, cutting face 1 is provided with a land 4 which is oriented approximately at a right angle to the respectively associated flank 2 and parallel to cutting edge 3. In the region on cutting face 1 following land 4 at a right angle to cutting edge 3, i.e. in the direction of chip discharge, the rake angle 7 is greater than 30°, preferably about 35°, with this rake angle 7 becoming smaller with increasing distance from land 4 and approaching zero at a distance from land 4 which is at least three times the width of the land. In one embodiment, the width of the land is about 0.15 mm. In cutting face regions 6 between the cutting point regions 5 of the cutting element, a plurality of chip ridges 11 project from cutting face 1. They are spaced at a distance 9 approximately corresponding to the width 8 of the land and, beginning at land 4, extend in the chip discharge direction, i.e. at a right angle to cutting edge 3, next to one another at a lateral spacing 10. The planar surfaces 12 of the chip ridges form a chip ridge rake angle 13 of about one-half the rake angle 7 of cutting face 1, with their front edges 14 on the side of the cutting edge projecting from cutting face 1 to about the height of land 4. The cutting face regions following—when seen in the chip discharging direction—cutting face regions 15, which are disposed between chip ridges 11, are configured as ramp elevations 16 having run-up ramps 17 which ascend from cutting face 1 to about the height of land 4 when seen in the chip discharging direction. As shown by the drawing figures, the side edges of chip ridges 11 and of ramp elevations 16 are sloped. This also facilitates unmolding of the cutting elements which are usually manufactured of hard metal in a sinter pressing process. The lateral spacing 10 between chip ridges 11 corresponds approximately to the width 18 of the chip ridges 11 themselves. The chip ridge surface 12 describes a straight line in the chip discharge direction. In particular, it is planar. The surface regions 19 of ramp elevations 16 adjacent run-up ramps 17, when seen in the chip discharge direction, lie in approximately the same plane as land 4. Run-up ramps 17 ascend in the chip discharge direction from that region of cutting face 1 in which cutting face 1 extends at approximately a right angle to cutting element flanks 2.

Between their cutting point regions 5, cutting edges 3 have a slightly concave shape. Cutting faces 1 of cutting point regions 5 are provided with at least one burr-like raised portion 20 whose longitudinal burr axis 21 extends at approximately a right angle to the tangent placed at cutting edge 3 at its point of intersection 22 with cutting edge 3.

Figure 2:
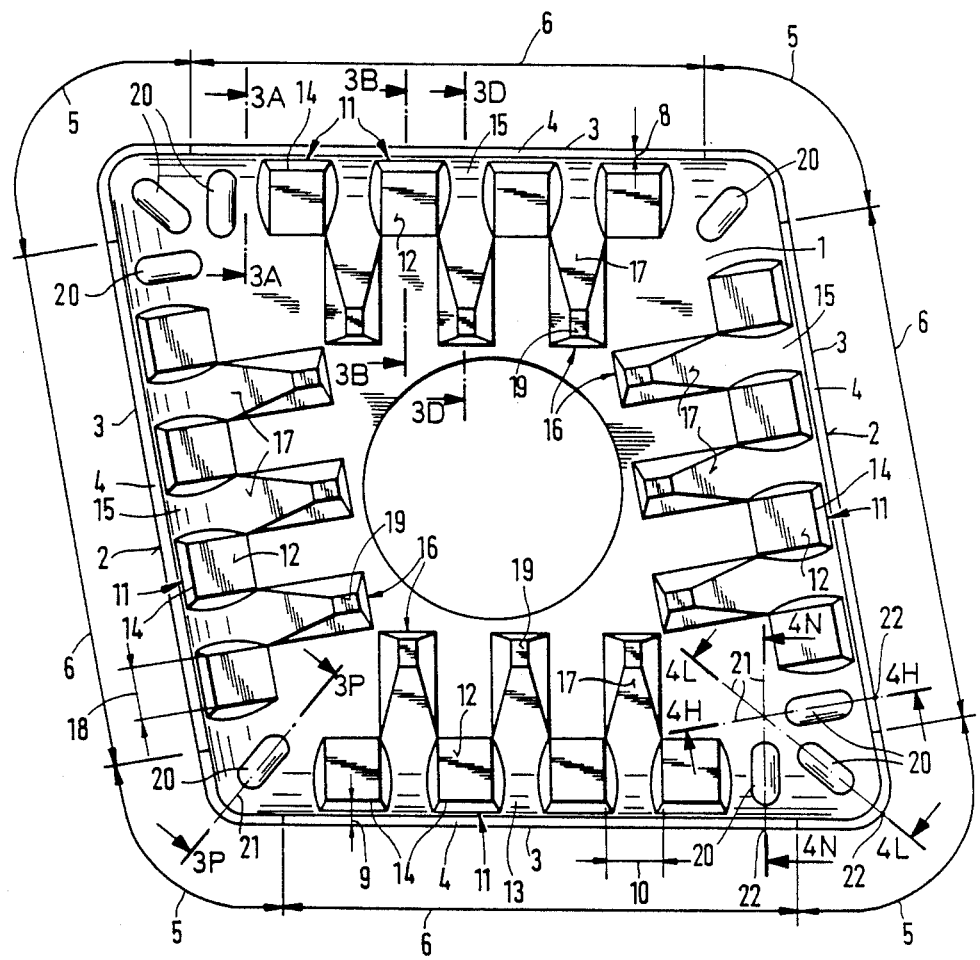
FIG. 2, a plan view of the cover face of the cutting element according to arrow II in FIG. 1.
Figure 3:
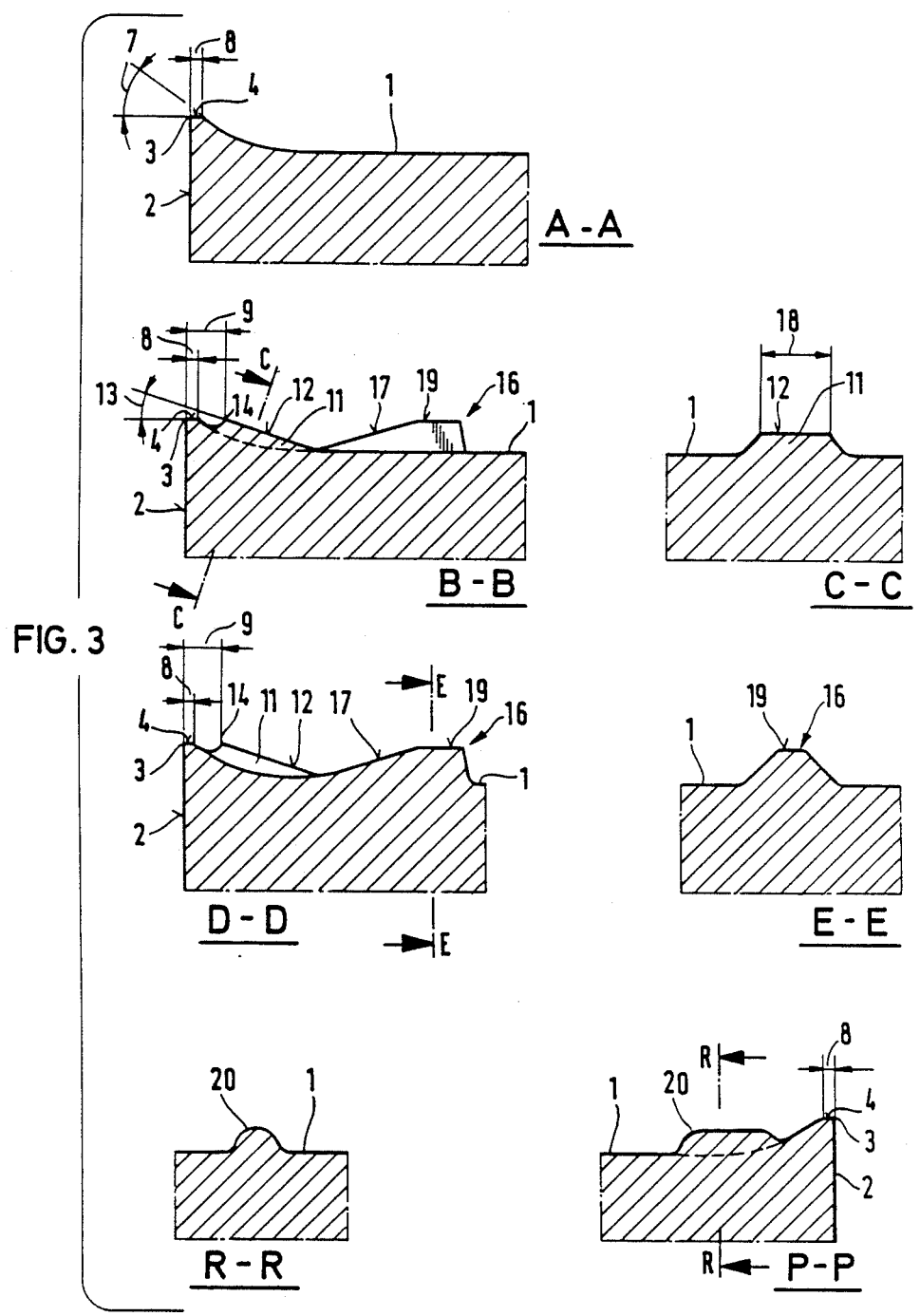
FIG. 3, various sectional detail views A—A, B—B, C—C, D—D, E—E, P—P and R—R of FIG. 2.

In the rhombic cutting element according to FIG. 2, three burr-like raised portions 20 are arranged next to one another in the acute-angled cutting point regions 5, with the outer two raised portions having their longitudinal burr axes 21 parallel to chip ridges 11.

Figure 5:
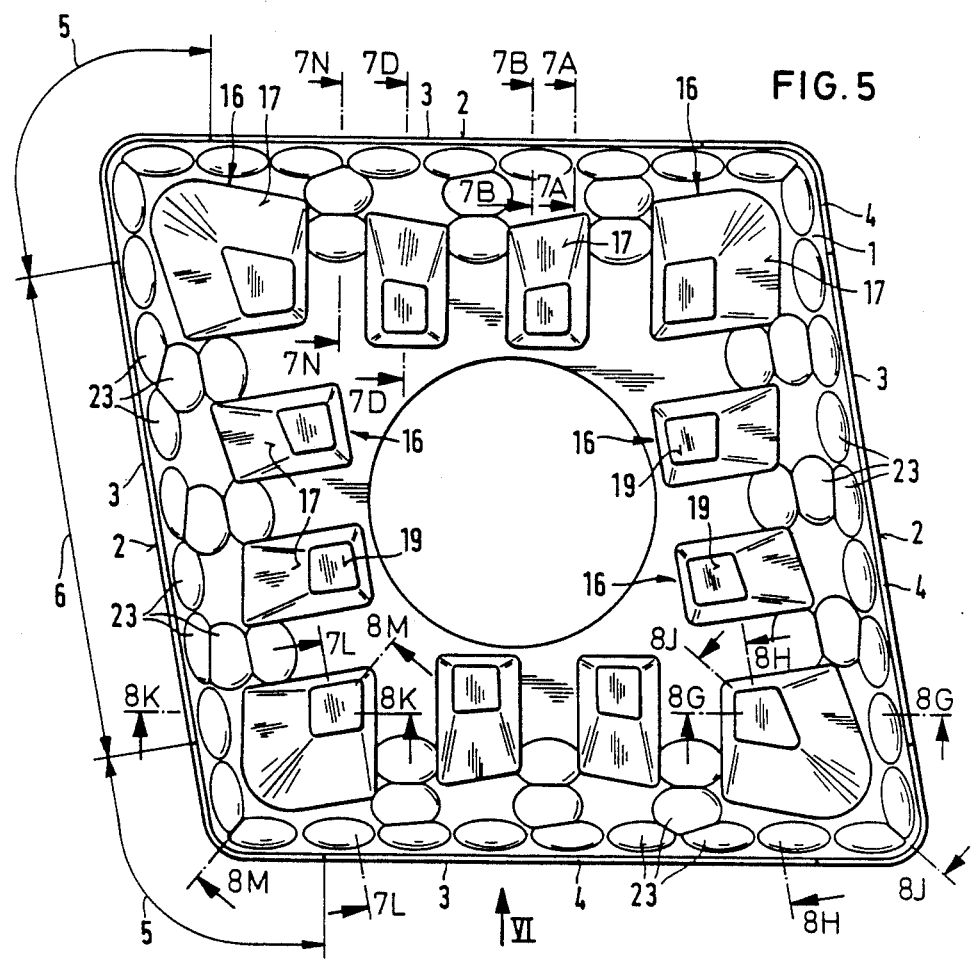
FIG. 5, a top view of the cover face of a modified embodiment of the cutting element according to FIGS. 1 to 4.
Figure 7:
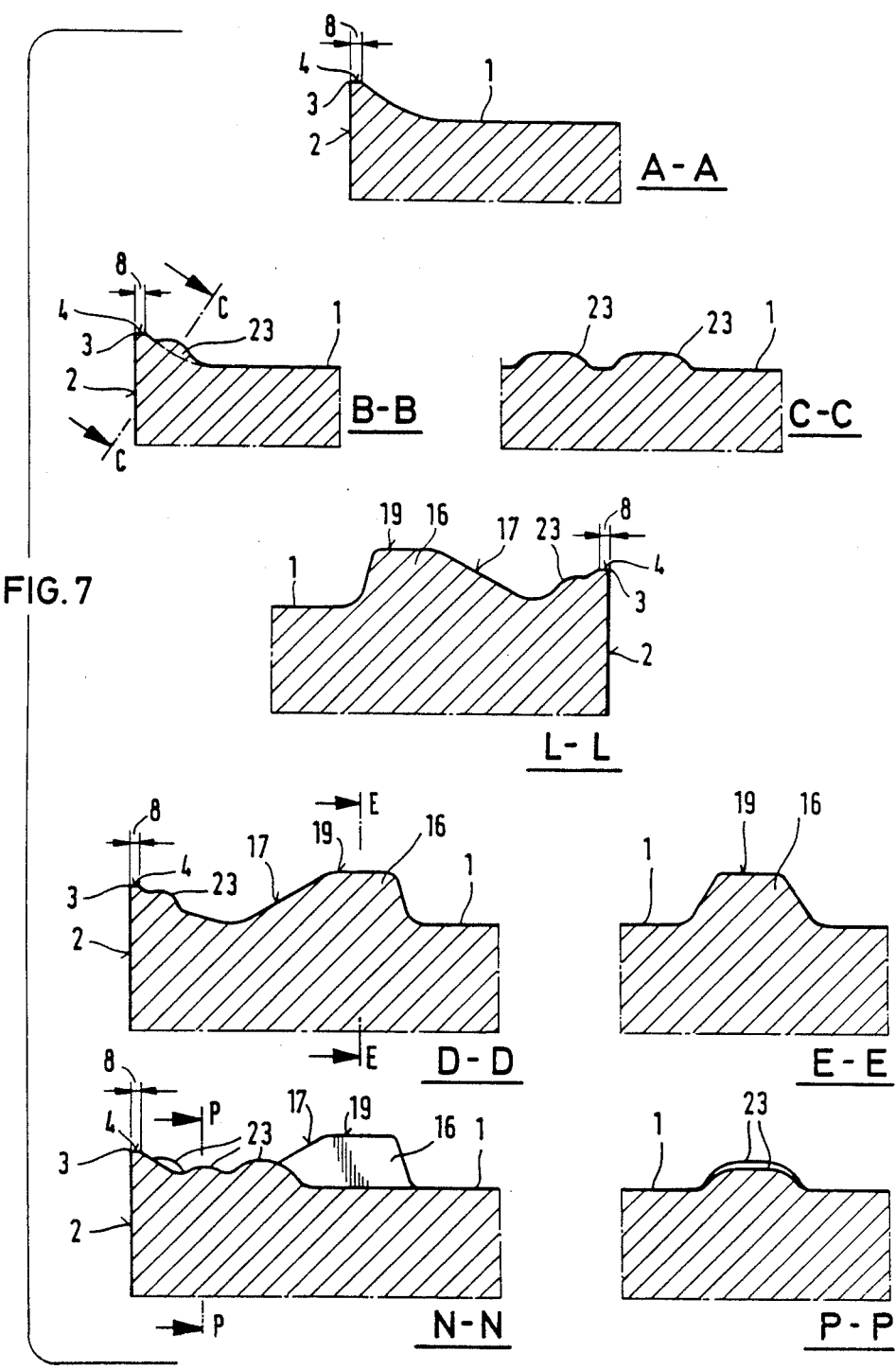
FIG. 7, sectional detail views A—A, B—B, C—C, D—D, E—E, L—L, N—N and P—P of FIG. 5.

The embodiment according to FIG. 5 has no chip ridges. Here the cutting face regions between land 4 and ramp elevations 16 are wavy, with the shape of the waves being effective in the chip discharge direction as well as transversely thereto. The wave shape is formed by a row of wart-like raised portions 23. In the embodiment according to FIG. 5, a ramp elevation 16 is also disposed in each cutting point region 5. However, this ramp elevation 16 is spaced closer to cutting edges 3 than the ramp elevations 16 disposed in the chip cutting regions 6 therebetween.

Figure 6:
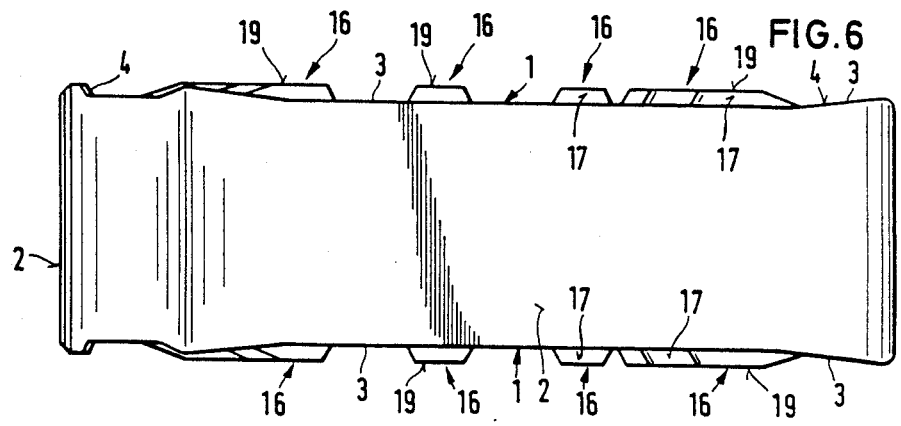
FIG. 6, a side view of the cutting element according to arrow VI of FIG. 5.

Ramp elevations 16 arranged in cutting point region 5 are provided with run-up ramps 17 toward cutting point region 5 as well as toward the cutting face regions 6 converging there. In the embodiment according to FIGS. 5 and 6, the surface regions 19 of ramp elevations 16 following run-up ramps 17 in the chip discharge direction are parallel to lands 4 extending in cutting point region 5 as well as beyond lands 4 in cutting face region 6.

It will be understood that the above description of the present invention is susceptible to various modifications, changes and adaptations, and the same are intended to be comprehended within the meaning and range of equivalents of the appended claims.

What is claimed is:

1. A cutting element for use in a cutting tool for chip cutting metal work, comprising:
   a prismatic body having a generally rhombic cutting surface and a plurality of circumferential side faces which are each adjacent said cutting surface;
   said cutting surface having a peripheral cutting edge bounding a land having a width and being oriented at approximately a right angle to each one of said plurality of circumferential side faces, said land being disposed substantially entirely within a plane; said cutting surface having a generally concave portion adjacent said land, said generally concave portion bounding a generally planar interior surface of said cutting surface, said cutting surface having a plurality of chip ridges disposed on said concave portion at a specified spacing in a row which is substantially parallel to the nearest portion of said land, each of said chip ridges having a chip ridge surface disposed at a selected angle relative too said plane of said land, each said chip ridge surface rising in a direction from said interior surface toward said land and terminating in a front edge disposed at a first selected distance from the nearest portion of said land, said front edge extending in the plane of said land; each said chip ridge surface having a portion terminating at a second selected distance from the nearest portion of said land; and
   a plurality of ramps disposed on said generally planar portion of said cutting surface, said plurality of ramps being disposed in a row which is substantially parallel to the nearest portion of said land and being alternatingly staggered with ones of said plurality of ramps in a direction perpendicular to said nearest portion of said land, each of said ramps having a lowermost end which beings at a distance from the nearest portion of said land approximately equal to said second selected distance, said lowermost end being disposed at the level of said planar interior surface, each of said ramps rising at a specified angle in a direction away from and generally perpendicular to the nearest portion of said land, each of said ramps having an uppermost portion which substantially extends in said plane containing said land;
   each portion of said concave portion being oriented at a respective rake angle relative to said plane, the rake angle diminishing with distance from the nearest portion of said land; said concave portion of said cutting surface meeting said land at a predetermined rake angle relative to said plane which is greater than 30 degrees, said rake angle of said concave portion diminishing to a value approaching zero degrees at a predetermined distance from the nearest respective location of said land, said predetermined distance being approximately three times the width of said land; and, said selected angle of said chip ridge surface being approximately half that of said predetermined rake angle.

2. A cutting element according to claim 1, wherein each of said plurality of chip ridges has a predetermined width and has a lateral spacing from any adjacent one of said plurality of chip ridges, said lateral spacing being approximately equal to said predetermined width of each of said plurality of chip ridges.

3. A cutting element according to claim 1, wherein said cutting edge has a plurality of corners, and respective slightly concave portions are disposed adjacent each of said corners in said cutting surface.

4. A cutting element according to claim 1, wherein said cutting surface has, in the vicinity of each of said corners, at least one respective burr-like raised portion having a longitudinal burr axis which extends in a direction which is generally normal to said land at the respective one of said corners.

* * * * *